United States Patent [19]

Neijzen

[11] Patent Number: 5,731,857
[45] Date of Patent: Mar. 24, 1998

[54] PICTURE DISPLAY DEVICE WITH MICROLENS ARRAY AND BEAM REFRACTING ELEMENT ARRAY ON EACH SIDE OR OPPOSITE REFLECTOR

[75] Inventor: Jacobus H.M. Neijzen, Eindhoven, Netherlands

[73] Assignee: U.S. Philips Corporation, New York, N.Y.

[21] Appl. No.: 742,075

[22] Filed: Oct. 31, 1996

[30] Foreign Application Priority Data

Nov. 2, 1995 [EP] European Pat. Off. ............ 95202961

[51] Int. Cl.$^6$ ................................................. G02F 1/1335
[52] U.S. Cl. ................................ 349/95; 349/57; 349/62
[58] Field of Search ............................ 349/57, 95, 62, 349/5

[56] References Cited

U.S. PATENT DOCUMENTS

| | | | |
|---|---|---|---|
| 5,396,350 | 3/1995 | Beeson et al. | 349/62 |
| 5,398,125 | 3/1995 | Willett et al. | 349/95 |
| 5,428,468 | 6/1995 | Zimmerman et al. | 349/62 |
| 5,473,453 | 12/1995 | Kurematsu | 349/95 |
| 5,555,109 | 9/1996 | Zimmerman et al. | 349/62 |

FOREIGN PATENT DOCUMENTS

0440495  8/1991  European Pat. Off. .
5-346578  12/1993  Japan .

*Primary Examiner*—Anita Pellman Gross
*Attorney, Agent, or Firm*—Walter M. Egbert, III

[57] ABSTRACT

Picture display device (1) comprising an illumination system (3) and a picture display panel (7) which is provided with a matrix of pixels. The picture display panel (7) may be a transmissive or a reflective picture display panel. In the case of a transmissive picture display panel, a first microlens array (19) is arranged at the illumination side of the picture display panel (7), and a second microlens array (21) is arranged at the side of the picture display panel (7) remote from the illumination system (3). In the case of a reflective picture display panel, the picture display device (1) comprises only one microlens array (61) which is arranged between the illumination system (3) and the picture display panel (7). In both cases, the number of lenses (23, 25; 63) of a microlens array (19, 21; 61) corresponds to the number of pixels (27) of the picture display panel (7). A beam-refracting element (37, 39; 67), by means of which a beam waist is realized at the area of the picture display panel (7), corresponds to each lens (23, 25; 63) of a microlens array (19, 21; 61).

12 Claims, 6 Drawing Sheets

PICTURE DISPLAY DEVICE WITH MICROLENS ARRAY AND BEAM REFRACTING ELEMENT ARRAY ON EACH SIDE OR OPPOSITE REFLECTOR

The invention relates to a picture display device comprising an illumination system, a transmissive picture display panel which is provided with a matrix of pixels, a first microlens array at the illumination side of the picture display panel, the number of lenses of which array corresponds to the number of pixels of the picture display panel, a second microlens array at a side of the picture display panel remote from the illumination system, the number of lenses of which array corresponds to the number of pixels of the picture display panel, and further comprising beam-refracting means and a projection lens system.

A picture display device of the type described in the opening paragraph is known from, for example, the English-language Abstract of JP-A 5-346578. The picture display device described in this Abstract is provided with a transmissive liquid crystalline picture display panel comprising a plurality of pixels arranged in a matrix. A first microlens array is arranged at the illumination side of the picture display panel and a second microlens array is arranged at the side of the picture display panel remote from the illumination side. The focal lengths of the two microlens arrays are substantially equal to the distances between the respective microlens arrays and the picture display panel. Moreover, a third microlens array imaging the first microlens array on the second microlens array is arranged proximate to the picture display panel.

It is known per se that a microlens array is used in picture display devices comprising liquid crystalline picture display panels, so as to reduce losses which are due to the limited aperture of the picture display panel. To this end, the illumination system, the microlens array and the picture display panel are preferably positioned with respect to each other in such a way that the beam incident on a lens of the microlens array is focused on the active portion of the corresponding pixel. A drawback is that, when the incident beam is divergent, a part of this beam will no longer be incident on the corresponding lens of the second microlens array, but the light will be distributed across two adjacent or more lenses. This crosstalk will give rise to an increase of the throughput and to a reduced picture quality.

The microlens array integrated with the picture display panel described in said Abstract ensures that a beam whose chief ray is not perpendicular to the picture display panel is refracted in such a way that its light only reaches the corresponding lens of the second microlens array without illuminating adjacent lenses. In this way, crosstalk between adjacent lenses is avoided as much as possible, which contributes to the picture quality and the required aperture of the projection lens system.

A drawback of the picture display device known from said Abstract is that the third microlens array is arranged very close to the LC material of the picture display panel. If the lenses are constituted by refractive index variations in one of the substrates or in both substrates of the LC material by means of ion exchange, the relevant substrate should comprise alkali ions. In this case, there is a great risk that the LC material will be contaminated by the ion exchange process. As a result of the ion exchange, the substrates will have different refractive indices. This renders it relatively difficult to realize a uniform thickness of the liquid crystalline layer in a large temperature range, because substrates with different refractive indices have different thermal coefficients of expansion. As a result of the above-mentioned phenomenon, it is relatively difficult to achieve a satisfactory picture quality if the microlens structure is arranged at the inner side of the substrates, close to the LC material.

A problem as described above for a picture display device with a transmissive picture display panel also presents itself in picture display devices having a reflective picture display panel, in which measures are taken to reduce crosstalk between adjacent lenses of the microlens array transmitting the light towards the projection lens system. In a picture display device having a reflective picture display panel, a microlens array is arranged at the illumination side of the picture display panel. The same microlens array ensures that the light modulated by the picture display panel is transmitted towards the projection lens system. Analogously with a picture display device having a transmissive picture display panel, it is relatively difficult to integrate a microlens array with the substrate at the side of this substrate facing the LC material, which microlens array ensures that the modulated beam is incident on only one lens of the microlens array.

It is an object of the invention to provide a picture display device in which the throughput in the light path between the illumination system and the projection lens system is maintained and, consequently, the aperture of the projection lens may remain limited. This picture display device can he manufactured much more easily than the hitherto known picture display devices in which this object is envisaged. The picture display device according to the invention has a particularly great advantage as far as maintaining the throughput is concerned, when the operation of the picture display panel is based on diffusion.

The principle proposed in accordance with the invention for achieving the above-mentioned object is applicable in picture display devices, both with transmissive and reflective picture display panels. The difference in construction between a picture display device having a reflective picture display panel and a picture display device having a transmissive picture display panel is an automatic result of the type of the picture display panel used.

A first embodiment of the picture display device according to the invention is characterized in that the focal lengths of the lenses of one microlens array are situated in the other microlens array, and vice versa, and in that the beam-refracting means are constituted by a first and a second beam-refracting array, while it holds for the first microlens array and the first beam-refracting array and for the second microlens array and the second beam-refracting array that a beam-refracting element corresponds to each microlens, the beam-refracting arrays having a beam-waisting effect at the area of the picture display panel.

The two microlens arrays are in each other's foci. By focusing on the microlenses of the second microlens array, it is ensured that a beam incident at an angle on a lens of the first microlens array only reaches one lens of the second microlens array, so that crosstalk between adjacent lenses is reduced considerably. At the area of the picture display panel, the array with beam-refracting elements has the effect that the beam is waisted around the center of a pixel, so that automatically a large part of the beam reaches the active portion of the pixel. Moreover, the throughput in the device remains substantially constant and consequently does not require an enlargement of the aperture of the projection lens system to maintain the same picture quality. Since the beam-refracting elements are no longer present at the inner side of the substrate, close to the LC material, but, for example, at the outer side of the substrate, or constitute a separate element, the manufacture of the device is simplified considerably. The beam-refracting elements are preferably integrated with the microlenses. The number of free surfaces is thus limited, and unwanted reflection losses can be avoided.

A second embodiment of the picture display device according to the invention is characterized in that the focal length of one lens of the microlens array is situated in one lens of the same microlens array, and in that the beam-refracting means are constituted by a beam-refracting array, while it holds for the microlens array and the beam-refracting array that a beam-refracting element corresponds to each microlens, the beam-refracting array having a beam-waisting effect at the area of the picture display panel.

In this embodiment, the picture display panel is a reflective picture display panel. In this case, the device comprises only one microlens array which is arranged between the illumination system and the picture display panel. The foci of the lenses of the array are situated in the array itself, so that the focal length is approximately equal to twice the distance between the microlens array and the picture display panel. A beam-refracting element corresponds to each lens of this microlens array. The array of beam-refracting elements is preferably integrated with the microlens array. A beam from the illumination system, incident on a lens of the microlens array, is waisted at the area of the picture display panel and transmitted to the microlens array again after reflection, where it is focused in, for example, the same lens as that of the on-going path. Due to the relative position of the microlens array and the picture display panel and the beam waist at the area of the picture display panel by the beam-refracting elements, the greater part of the beam will automatically be incident on the active portion of the pixel corresponding to the microlens.

In both of the above-mentioned embodiments, the throughput in the picture display device is maintained while maintaining intensity, and the risk of crosstalk between adjacent lenses of the microlens array, through which the modulated light is sent to the projection lens system, is reduced considerably.

A preferred embodiment of the picture display device according to the invention is characterized in that the beam-refracting elements are microprisms having at least two facets in at least one dimension.

In this embodiment, a microprism is associated with each lens of each microlens array. The prisms themselves do not introduce any extra divergence. The microlenses focus an incident beam, while the microprisms waist the beam at the area of the picture display panel and direct it towards the desired lens of the microlens array which is to transmit the modulated beam towards the projection lens system.

The number of facets in one dimension determines the factor at which the beam is waisted at the area of the picture display panel in the direction wherein the prisms succeed each other. For two facets, the beam diameter at the area of the picture display panel is reduced by half, while maintaining the light intensity. Reduction in one direction may be sufficient because the aperture in the vertical and horizontal direction does not have to be the same.

A further embodiment of the picture display device according to the invention is characterized in that the prisms of the microprism array have m facets in a first dimension and n facets in a second dimension, in which m and n are integers.

By providing prism facets in two dimensions, the aperture can be influenced in two dimensions. The number of facets in a given direction again determines the factor by which the aperture in that direction is reduced.

A further embodiment of the picture display device according to the invention is characterized in that the beam-refracting elements are constituted by at least two lens elements which extend side by side in a given direction.

A beam-refracting element may also consist of a plurality of lenses. The plurality of lenses extending side by side in a given direction is decisive of the factor by which the beam in that direction is waisted at the area of the picture display panel.

If a reflective picture display panel is used, whose operation is based on modulation of the state of polarization of an incident beam, the beam from the illumination system and the beam modulated by the picture display panel may coincide because they can be distinguished in the state of polarization.

If the operation of a reflective picture display panel is based on diffusion of an incident beam as in, for example, a PDLC (polymer dispersed liquid crystal), care should be taken that the light beam from the illumination system and the light beam modulated with picture information by the picture display panel do not coincide. To this end, a further embodiment of the picture display device according to the invention is characterized in that the microlens array and the picture display panel are offset through a distance of ½ n.$p_p$ with respect to each other, in which $p_p$ is the pitch of the picture display panel and n is an integer.

Consequently, the beam modulated by the picture display panel will reach a different lens of the microlens array than the lens through which the beam incident on the pixel has come. If n=1, the modulated beam is incident on a lens adjacent to the lens which has passed the incident beam. In this way, the non-modulated and the modulated beam are spatially separated from each other and can consequently be distinguished.

A further embodiment of the picture display device according to the invention is characterized in that the picture display panel, the beam-refracting elements and the microlens array, or the first and the second microlens array, are arranged in a telecentric configuration.

It is thereby achieved that the relative positions of the microlenses of the microlens arrays and the pixels of the picture display panel are independent of the location on the picture display panel.

These and other aspects of the invention will be apparent from and elucidated with reference to the embodiments described hereinafter.

Figure 1:
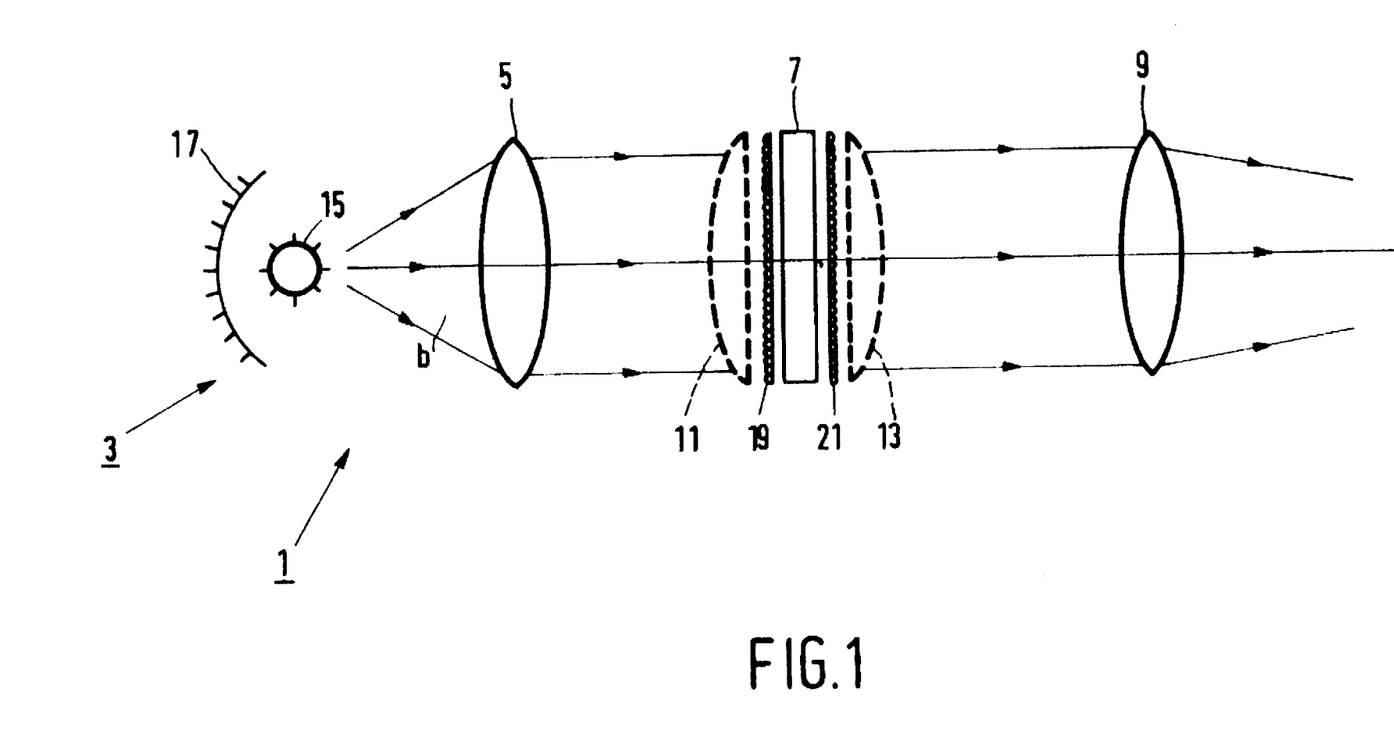
FIG. 1 shows an embodiment of an image projection device provided with a microlens array at both sides of a transmissive picture display panel.

The picture display device 1 shown diagrammatically in FIG. 1 comprises an illumination system 3 for supplying a light beam b. This light beam b is incident on a picture display panel 7 via a condensor lens system 5 illustrated by way of a single condensor lens for the sake of simplicity. The light modulated by the picture display panel 7 is subsequently passed for projection to a projection lens system 9 illustrated by way of a single projection lens for the sake of simplicity.

The illumination system 3 consists of, for example a light source 15 and a spherical reflector 17. The reflector 17 ensures that the greater part of the light emitted by the light source 15 in a direction away from the condensor lens 5 is as yet transmitted to this condensor lens 5.

The picture display panel 7 may comprise, for example a liquid crystalline material and a matrix of pixels whose operation is based on the twisted nematic (TN) the super twisted-nematic (STN) or the ferro-electric effect so as to modulate the direction of polarization of light incident thereon in accordance with the picture information to be displayed. On the other hand, the operation of the picture display panel may also be based on diffusion of incident unpolarized light such as, for example in a polymer dispersed liquid crystal (PDLC). In all these cases, the layer of liquid crystalline material 11 is provided, for example, between two optically transparent substrates, for example of glass or a synthetic material.

A liquid crystalline picture display panel is divided into a number of pixels comprising an active and a passive portion. The ratio between the active and the passive portion per pixel defines the aperture of the picture display panel. Due to a limited aperture, the light losses may be considerable in a picture display device with a liquid crystalline picture display panel. For this reason, a microlens array 19 is often used in the light path between the illumination system 3 and the picture display panel 7 so as to concentrate a maximal quantity of light from the light source 15 on the active parts of the picture display panel 7. However, after passage through, or reflection on, the picture display panel, the divergence of the light beam and hence the effective throughput of the device will then also increase considerably. A higher throughput requires a projection lens with a larger aperture, which thus becomes larger and more expensive. Particularly in systems with diffusing picture display panels, the increase of the throughput is very detrimental because the microlens arrays and the picture display panel are in the middle of the Schlieren optical system. Consequently, the contrast and brightness are very much affected due to a decrease of the beam quality, because these two qualities are determined by the lens aperture. In many known devices, the focal length of the microlens arrays is substantially equal to the distance between the microlens array and the picture display panel.

To reduce the divergence of the light beam, and consequently an increase of the resultant effective throughput of the device, a second microlens array 21 is often arranged behind the picture display panel 7, also with a focal length which is substantially equal to the distance between the microlens array and the picture display panel. An example of a picture display panel with a microlens array on both sides is described in, for example, European Patent Application EP 0 440 495.

If the picture display panel is a reflective picture display panel, one microlens array 23 is present between the illumination system 3 and the picture display panel 7 which concentrates the incident beam on the active parts of the picture display panel and converges the modulated beam from the picture display panel before this beam reaches the projection lens system.

To prevent light incident on a microlens of the first microlens array from being divided between two or more microlenses of the microlens array converging the modulated light, beam-refracting means should be provided. This may be realized, for example by arranging a microlens array close to the LC material of the picture display panel, for example, by integration with the inner side of one of the substrates of the LC material, as has been described in the English-language Abstract of JP-A 5-346578.

The present invention proposes another possibility, in which the throughput of a picture display device with two microlens arrays in the case of a transmissive picture display panel and one microlens array in the case of a reflective picture display panel is substantially maintained in the light path between the illumination system and the projection lens system, while also the light intensity is maintained, which device can therefore be manufactured in a considerably simpler manner.

To this end, the picture display device according to the invention comprises beam-refracting elements which correspond to the microlenses of the one microlens array in the case of a reflective picture display panel, and to the microlenses of each of the microlens arrays in the case of a transmissive picture display panel. They are preferably integrated with each other. In both types of picture display devices, the envisaged object is achieved in conformity with the same principle. The difference in its construction is automatically determined by the type of picture display panel. In the picture display device according to the invention, the focal lengths of the microlens arrays are not situated in the picture display panel but in a microlens array.

One beam-refracting element of a beam-refracting array corresponds to each lens of a microlens array. A preferred embodiment of a beam-refracting element is a microprism. A beam-refracting element may also consist of a number of lenses which extend side by side in a given direction. FIG. 4 will be further described with reference to some embodiments of lenses and prisms in combination with microlenses.

Figure 2A:
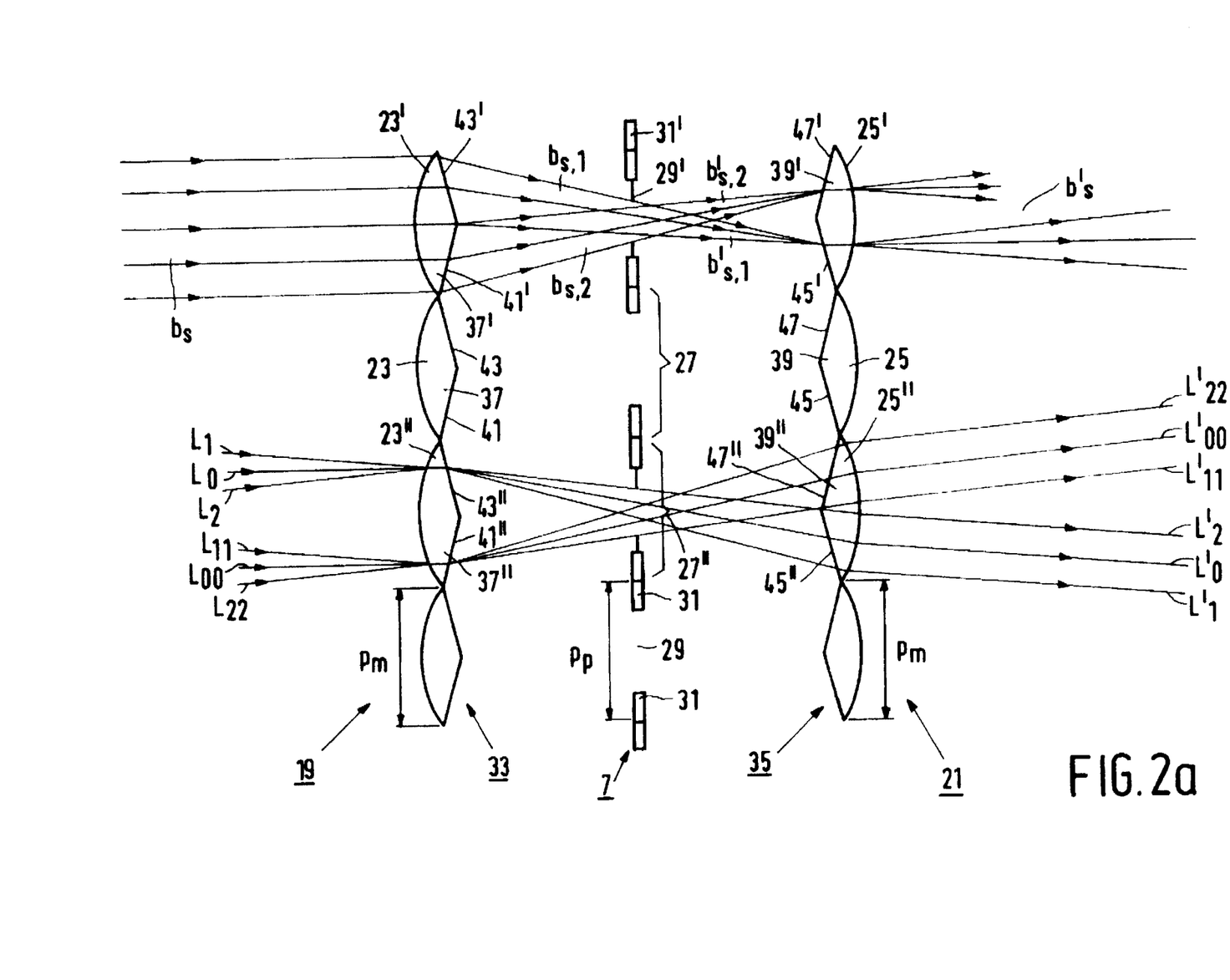
FIGS. 2a and 2b show two embodiments of a part of a picture display device according to the invention, with a transmissive picture display panel in which also the radiation path associated with a pixel of the picture display panel is illustrated for a perfectly parallel beam and for a light ray from a beam having a slight divergence.

FIG. 2a shows a first embodiment of a part of a picture display device according to the invention. The picture display panel 7 is a transmissive picture display panel in this case. A first, single microlens array 19 with lenses 23 is arranged at the illumination side of the picture display panel 7, and a second, single microlens array 21 with lenses 25 is arranged at the opposite side of the picture display panel 7. The two microlens arrays 19, 21 are in each other's Foci. The pitch $P_m$ and the number of lenses are the same for the two microlens arrays 19, 21 and correspond to the pitch $p_p$ and to the number of pixels 27, respectively, of the picture display panel 7. Each microlens of a microlens array corresponds to a pixel. The dimensions of a microlens 23, 25 are preferably equal to the dimensions of a full pixel 27. A full pixel is understood to mean the active portion 29 plus the passive portion 31.

The microlens array 19 is combined with a microprism array 33 comprising microprisms 37, and the microlens array 21 is combined with a microprism array 35 comprising microprisms 39. The microlenses may fade away, for example, from the picture display panel, as is shown in the Figures, whereas the microprisms may face the picture display panel, or conversely.

To illustrate the radiation path, the sub-beam $b_s$ of the beam b supplied by the illumination system 3 and collimated by the condensor lens 5 is considered, this sub-beam being incident on the lens 23' of the first microlens array 19. The beam $b_s$ will be focused by the lens 23' in the corresponding lens 25'. Due to the presence of a microprism 37', which in the Figure has two facets 41', 43' in a plane perpendicular to the plane of the drawing, the beam $b_s$ will be split up into two parts $b_{s,1}$ and $b_{s,2}$ each being sent to a facet 45' and 47', respectively, of the corresponding microprism 39'. At the location of the pixel 27', which corresponds to the microlenses 23', 25' and the microprisms 37', 39', the original beam $b_s$ is waisted in the direction in which the facets 43', 41' extend, and this by a factor equal to the number of facets. When each combination of microlens and microprism 23, 37; 25, 39 from each of the two composite arrays 19, 33; 21, 35 corresponds to one pixel 27, the greater part of the light will automatically be concentrated on the active portion 29 of this pixel 27.

The beams $b'_{s,1}$ and $b'_{s,2}$ modulated with picture information are incident on the microprism 39', on the facets 45' and 47', respectively, of the second microprism array 35 which is combined with the second microlens array 21. The microprism 39' will refract the beams $b'_{s,1}$ and $b'_{s,2}$ to the microlens 25', so that the beams are combined to beam $b'_s$. The sub-beam $b'_s$ is subsequently passed to the projection lens system 9 in which all modulated sub-beams from other microlenses 25 are combined and will yield a picture after projection.

The example hitherto described relates to a perfectly parallel beam. However, in practice, a parallel light beam will still have a slight divergence due to the finite dimensions of the light source. The same Figure also shows how the radiation path is formed for such a beam. The spatial angle of the beam is determined by the light rays $L_1$ and $L_2$, while $L_0$ is the chief ray. $L'_0$, $L'_1$ and $L'_2$ are the modulated rays. Upon passage through the microlens 23", the microprism 37", the pixel 27", the microprism 39" and the microlens 25", the increase of the angle with respect to the normal on the panel 7 is larger for light rays which are instant at the edge of the microlens 23" than for light rays which are incident closer to the center of the microlens 23". As a result, the throughput for a light beam incident on a microlens 23 of the first microlens array 19 is substantially equal to the throughput for this light beam when it leaves the corresponding microlens 25 of the second microlens array 23.

The rays $L_{00}$, $L_{11}$ and $L_{22}$ and modulated rays $L'_{00}$, $L'_{11}$ and $L'_{22}$ illustrate the radiation path for a beam incident on another position of the microlens 23".

Due to the combination of a microlens array and a microprism array in front of and behind the picture display panel, it is achieved that the throughput in the system is substantially maintained, and that crosstalk between adjacent lenses is reduced considerably, without intensity being lost.

Figure 2B:
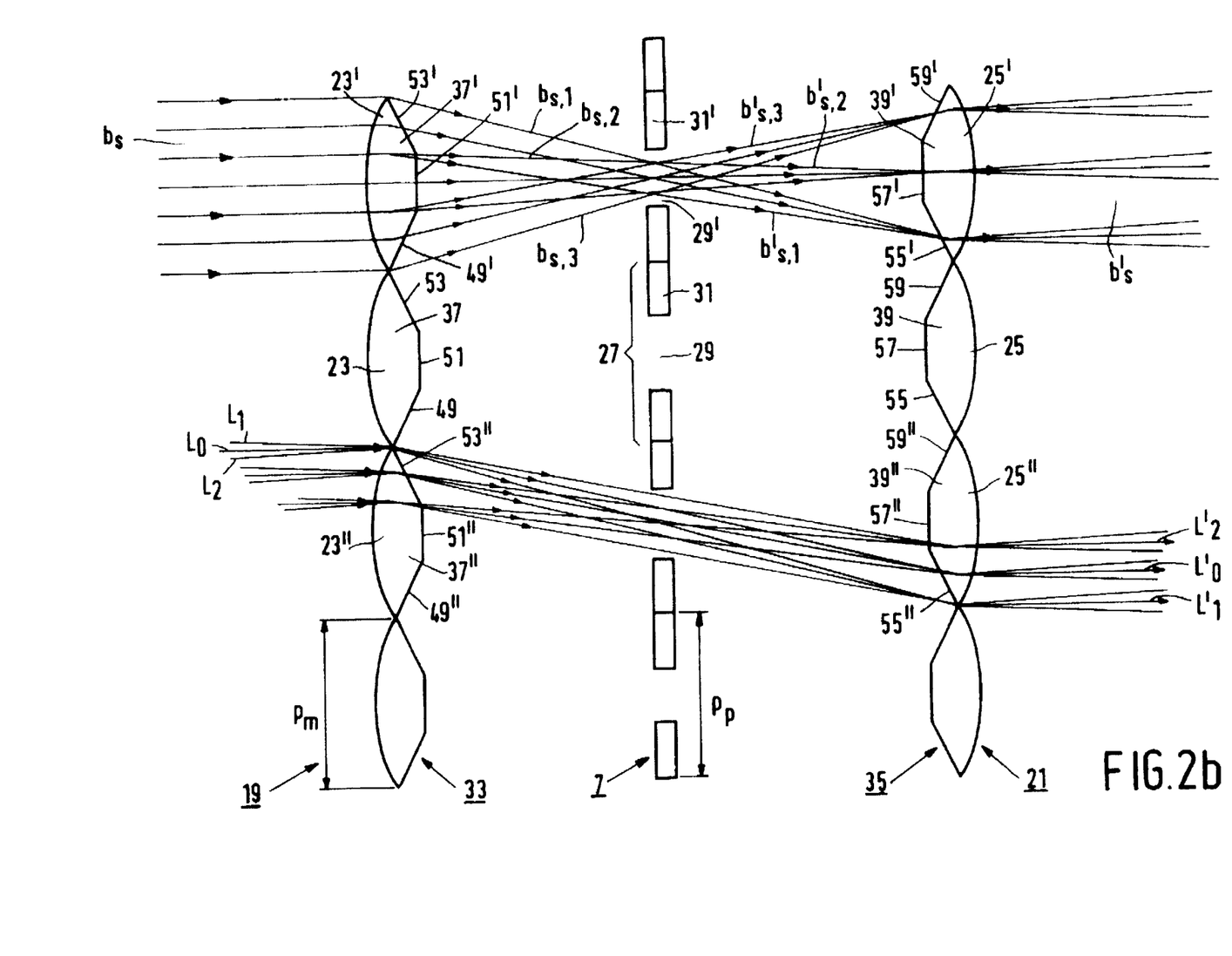

In the embodiment shown in FIG. 2a, the microprisms 37 and 39 have two facets 41, 43 and 45, 47 which are situated one below the other in a plane perpendicular to the plane of the drawing. In FIG. 2b, analogously to FIG. 2a, the radiation path is illustrated for a perfectly parallel beam and for some-light rays $L_0$, $L_1$ and $L_2$ of a beam having a slight divergence for microprisms 37, 39 with three facets 49, 41, 53 and 55, 57, 59, respectively, which are situated one below the other in a plane perpendicular to the plane of the drawing. The original beam $b_s$ is consequently split tip into three beams, so that the beam at the area of the picture display panel is waisted by a factor of three in the direction in which the microprisms extend.

The number of facets in a given direction determines the factor with which the diameter of the beam in this direction is reduced. Instead of in one dimension, facets may also be arranged in a second dimension. The number of facets per dimension may differ, because the aperture in the two corresponding directions does not necessarily have to be the same.

Figure 3A:
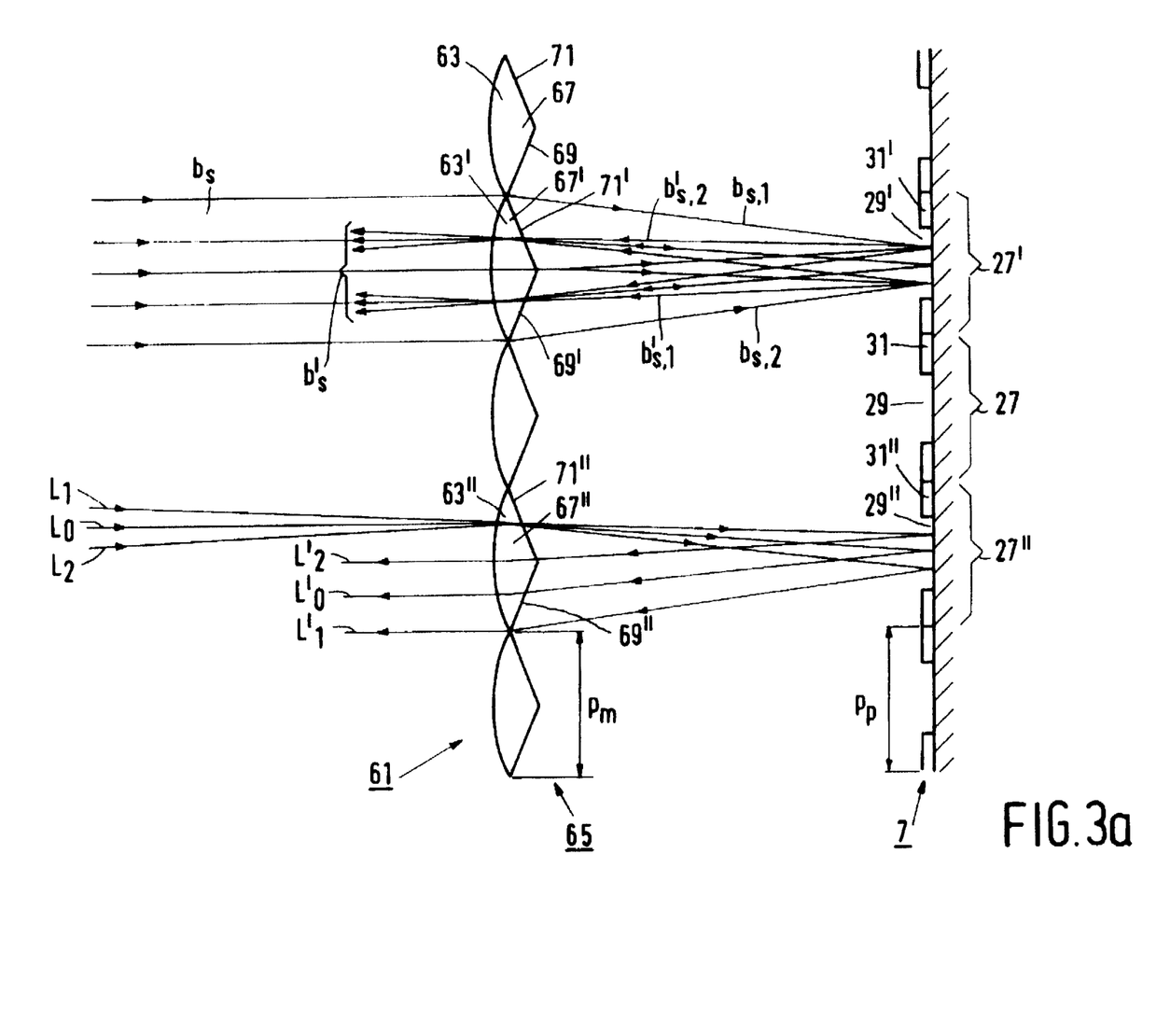
FIGS. 3a and 3b show two embodiments of a part of a picture display device according to the invention, with a reflective picture display panel in which also the radiation path associated with a pixel of the picture display panel is illustrated for a perfectly parallel beam and for a light ray from a beam having a slight divergence.

FIG. 3a shows a part of a picture display device with a reflective picture display panel. The microlens array 61 comprising lenses 63 is combined with a microprism array 65 comprising microprisms 67. The foci of the lenses 63 of the array 61 are situated in the array itself, so that the focal length is approximately equal to twice the distance between the microlens array 61 and the picture display panel 7. A parallel sub-beam $b_s$ is focused by a microlens 63' in the lens 63' itself. In fact, when the microprism 67' has two facets 69', 71', an incident beam $b_s$ will be split up into two parts $b_{s,1}$ and $b_{s,2}$. The beams $b_{s,1}$ and $b_{s,2}$ are passed by the microprism 67' to approximately the same position on the picture display panel. The beams $b'_{s,1}$ and $b'_{s,2}$ modulated by the picture display panel 7 are subsequently reflected towards the microprism 67' and refracted by the microprism 67' to the microlens 63'. The microlens 63' ensures that the beams $b'_{s,1}$ and $b'_{s,2}$ are combined to a beam $b'_s$ which, together with other modulated sub-beams,will be projected to form an image. Since the focal length is situated in the microlens array, the modulated beams $b'_{s,1}$ and $b'_{s,2}$ will be focused therein, but in the different part of the lens 63' than the part from which they come. In other words,the beam passed by the upper part of the microprism to the picture display panel will pass through the lower part of the microprism to the projection lens system.

The same Figure also illustrates the radiation path for the chief my $L_0$ and the deviating, diverging light rays $L_1$ and $L_2$ of a slightly diverging beam. Here again, the throughput upon passage through the microlens-microprism array and the picture display panel is substantially maintained. The radiation path is illustrated for three beams which are incident on three different positions of the microlens 23".

FIG. 3a shows an embodiment in which the microprisms 67 have two facets 69, 71 in one dimension, but it is obvious that the microprisms in a reflective picture display panel may have more than two facets in one dimension or at least two facets in at least two dimensions,dependent on the desired aperture reduction, while maintaining the intensity.

If, for example, the microprisms have two facets in two dimensions,in other words four facets in total, a waist can be realized which is equal to ¼ of the waist which would apply without beam-refracting means,without having to sacrifice intensity.

If a picture display device with a reflective picture display panel is used, and notably if the operation of this picture display panel is based on diffusion of incident light, it will be necessary for the beam sent to the picture display panel and the beam returning from the picture display panel to be spatially separated from each other so as to be able to distinguish these beams. If the operation of the picture display panel is based on the modulation of the state of polarization of incident light, the spatial separation of the beam to be modulated and the modulated beam is not a requirement, because a polarization filter can then be used.

Figure 3B:
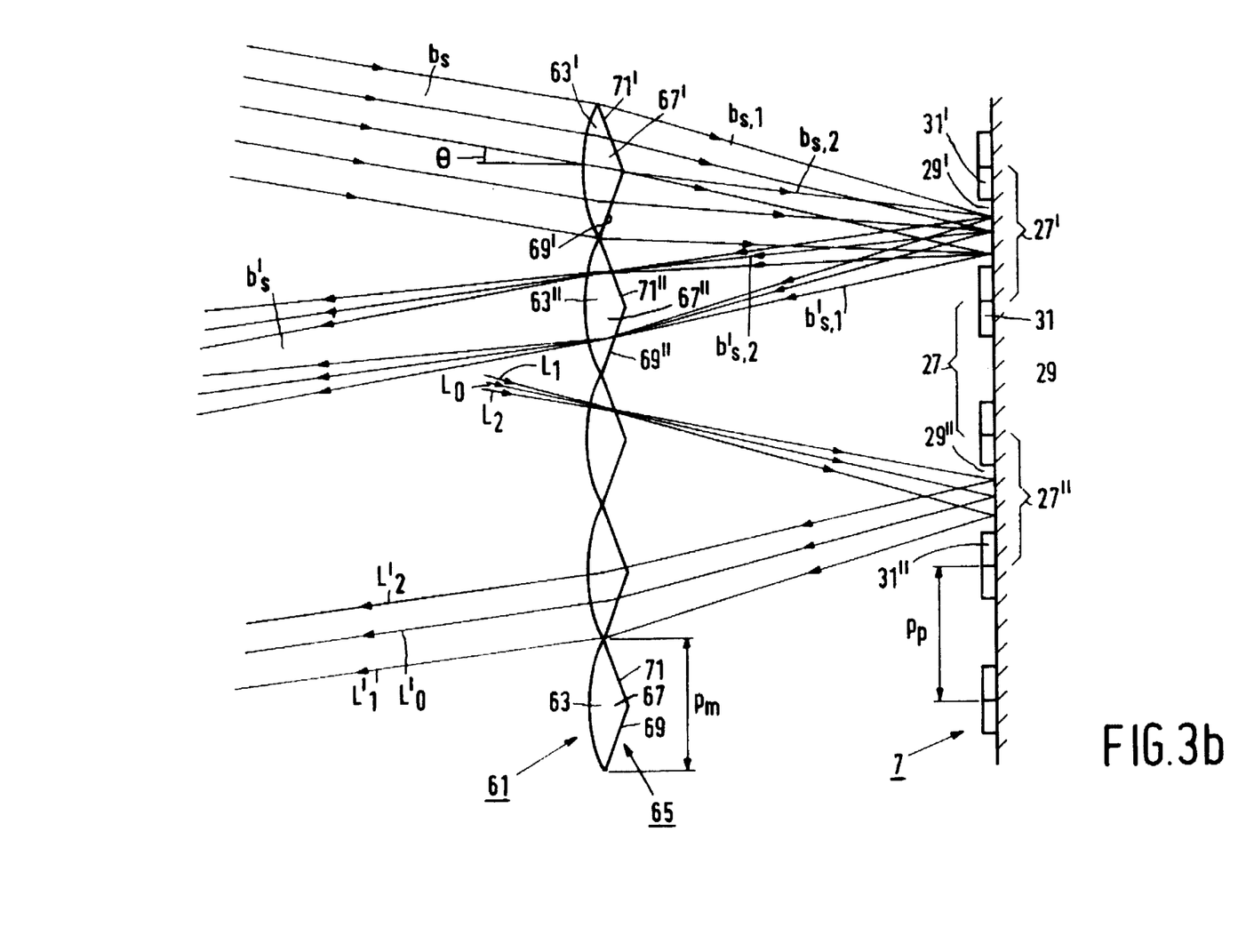

To be able to distinguish the on-going beam $b_s$ from the returning beam $b'_s$ in a diffusing picture display panel, for example, a PDLC, these beams are spatially separated by offsetting the picture display panel 7 and the combined array 61, 65 through half a pixel pitch $p_p$ or an integral multiple thereof, in other words,by realizing an offset through a distance ½ $n.p_p$, with n being an integer. An embodiment, in which the offset is half a pitch, is shown in FIG. 3b, together with the associated radiation path. In the embodiment shown, the microprisms 67'; 67" have two facets 69', 71';

69", 71" in one dimension. In this case, the parallel subbeam $b_s$ should be incident on the microlens 63' at an angle $\theta$. The microlens 63' converges the beams $b_{s,1}$ and $b_{s,2}$ and the microprism 67' refracts them so that the beam is waisted at the area of the picture display panel 7. Now, the beams $b'_{s,1}$ and $b'_{s,2}$ formed by modulation and after reflection will not be passed to the same microprism 67' and the same microlens 63'. Due to the suitable choice of the angle of incidence $\theta$ at which the beam $b_s$ is incident on the microlens 63', it can be ensured that the modulated beams $b'_{s,1}$ and $b'_{s,2}$ are incident on the adjacent microprism 67" and the corresponding microlens 63". In this way, the beams $b_s$ and $b'_s$ can be spatially separated from each other.

FIG. 3b also illustrates the radiation path for the chief ray $L_0$ and for deviating, divergent light rays $L_1$ and $L_2$ of a slightly diverging beam.

FIG. 4 shows a number of possibilities for which the combination of a microlens and a microprism can be realized. They are equivalent embodiments. The desired shape may be realized in known mechanical ways. Examples are shown in FIGS. 4a, 4b and 4c.

Figure 4A:
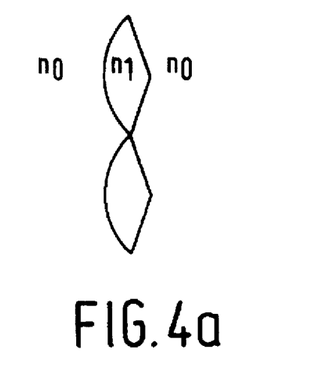
FIG. 4a–4c shows some possibilities on which the combination of a microlens and a microprism in a composite array can be realized.
Figure 4B:
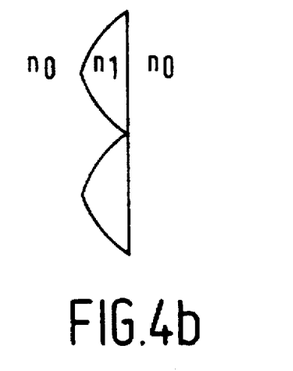
Figure 4C:
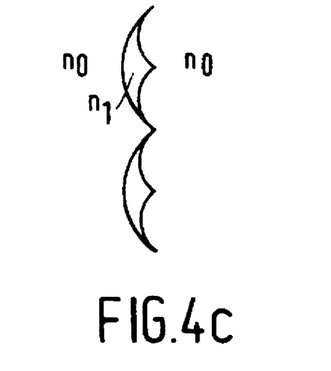
Figure 4D:
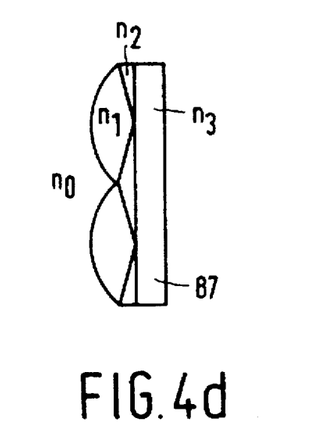
Figure 4E:
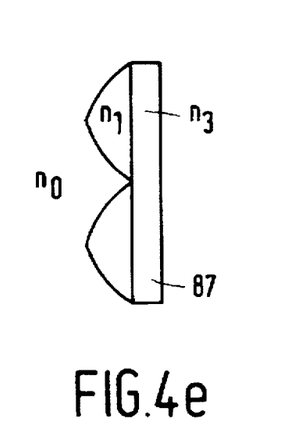
Figure 4F:
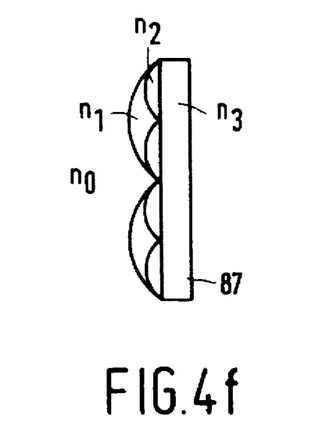
Figure 4G:
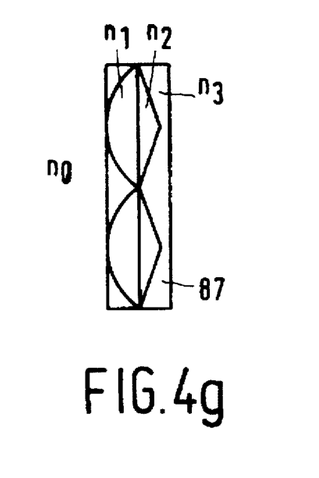
Figure 4H:
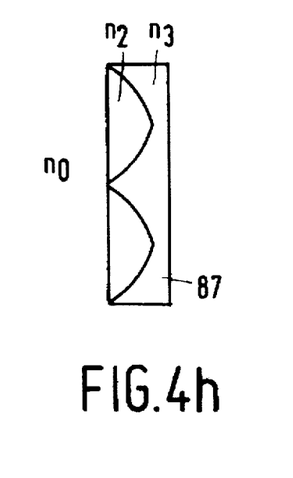
Figure 4I:
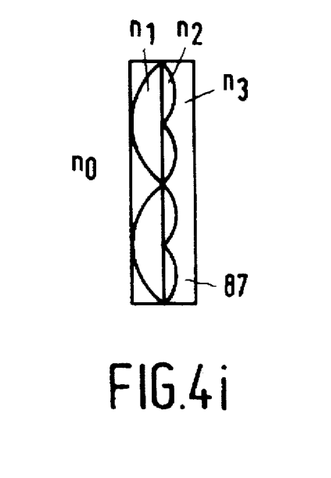

The combination may also be formed by providing layers having different refractive indices $n_1$ and $n_2$ on each other on a substrate 87. $n_o$ represents the refractive index of air and $n_3$ represents the refractive index of the substrate. FIGS. 4d and 4f show some embodiments. In FIG. 4e, the layer provided has such a shape that it is sufficient to use only one material having refractive index $n_1$.

Another possibility is to provide refractive index variations in a substrate 89 by means of, for example, ion exchange. The spatial distribution of the refractive index is represented by the lens-shaped areas shown in the substrate 87. $n_o$ represents the refractive index of air and $n_3$ represents the refractive index of the material of the substrate without ion exchange. By ion exchange, areas with refractive indices $n_1$ and $n_2$ are realized in the case of FIGS. 4g and 4i and with a single refractive index $n_1$ in the case of FIG. 4h.

Some lens structures may be manufactured by a combination of two of the above-mentioned methods.

If the lens structures are structures as shown in FIGS. 4d, 4e and 4f, the substrate 87 for the lens structure may be, for example, the substrate of the LC material on which the structure is provided at the side of the substrate remote from the LC material. In this manner, the LC material will not be contaminated.

As is shown in FIG. 1, the picture display panel 3 in the picture display device according to the invention may also be preceded and succeeded by a field lens 11, 13, so that a telecentric illumination is obtained. The advantage thereof is that the relative positions of the microlenses and the pixels of the picture display panel are independent of the position on the picture display panel. Since the field lenses 11, 13 are facultative, they are shown by means of broken lines.

I claim:

1. A picture display device comprising an illumination system, a transmissive picture display panel which is provided with a matrix of pixels,a first microlens array at the illumination side of the picture display panel, the number of lenses of which array corresponds to the number of pixels of the picture display panel, a second microlens array at a side of the picture display panel remote from the illumination system, the number of lenses of which array corresponds to the number of pixels of the picture display panel, and further comprising beam-refracting means and a projection lens system, characterized in that the focal lengths of the lenses of one microlens array are situated in the other microlens array, and vice versa, and in that the beam-refracting means are constituted by a first and a second beam-refracting array, while it holds for the first microlens array and the first beam-refracting array and for the second microlens array and the second beam-refracting array that a beam-refracting element corresponds to each microlens,the beam-refracting arrays having a beam-waisting effect at the area of the picture display panel.

2. A picture display as claimed in claim 1 characterized in that the picture display panel, the beam-refracting elements and the first and the second microlens arrays are arranged in a telecentric configuration.

3. A picture display device as claimed in claim 1, characterized in that the beam-refracting elements are microprisms having at least two facets in at least one dimension.

4. A picture display device as claimed in claim 1, characterized in that the beam-refracting elements are constituted by at least two lens elements which extend side by side in a given direction.

5. A picture display device comprising an illumination system and a reflective picture display panel which is provided with a matrix of pixels,in which a microlens array is arranged between the illumination system and the picture display panel, the number of lenses of which array corresponds to the number of pixels of the picture display panel, and further comprising beam-refracting means and a projection lens system, characterized in that the focal length of one lens of the microlens array is situated in one lens of the same microlens array, and in that the beam-refracting means are constituted by a beam-refracting array, while it holds for the microlens array and the beam-refracting array that a beam-refracting element corresponds to each microlens,the beam-refracting array having a beam-waisting effect at the area of the picture display panel.

6. A picture display device as claimed in claim 5, characterized in that the beam-refracting elements are microprisms having at least two facets in at least one dimension.

7. A picture display device as claimed in claim 6 characterized in that the prisms of the microprism array have m facets in a first dimension and n facets in a second dimension, in which m and n are integers.

8. A picture display device as claimed in claim 7, characterized in that the microlens array and the picture display panel are offset through a distance of ½ n.$p_p$ with respect to each other, in which $p_p$ is the pitch of the pixels of the picture display panel and n is an integer.

9. A picture display device as claimed in claim 6, characterized in that the microlens array and the picture display panel are offset through a distance of ½ n.$p_p$ with respect to each other, in which $p_p$ is the pitch of the pixels of the picture display panel and n is an integer.

10. A picture display device as claimed in claim 5, characterized in that the beam-refracting elements are constituted by at least two lens elements which extend side by side in a given direction.

11. A picture display device as claimed in claim 10, characterized in that the microlens array and the picture display panel are offset through a distance of ½ n.$p_p$ with respect to each other, in which $p_p$ is the pitch of the pixels of the picture display panel and n is an integer.

12. A picture display device as claimed in claim 5, characterized in that the picture display panel, the beam-refracting elements and the microlens array are arranged in a telecentric configuration.

\* \* \* \* \*